Patented Aug. 31, 1948

2,448,090

UNITED STATES PATENT OFFICE 2,448,090

ANTISEIZE AND SEALING COMPOSITION

Robert C. Fuhrman, Cleveland, Ohio, assignor to The Parker Appliance Company, Cleveland, Ohio, a corporation of Ohio No Drawing. Application May 3, 1944, Serial No. 533,934

3 Claims. (Cl. 106—177)

In many cases of employment of sectional conduits for fluids, it is necessary to seal the parts under conditions permitting easy separation and assembly.

In employment of oxygen lines on aircraft, for example, sections of the oxygen system are usually joined by threaded connections. It is necessary to provide sealing means capable of eliminating leakage. Such means should have the necessary characteristics to avoid mechanical difficulties in assembly and separation; and above all, must have the necessary characteristics for preventing physiological harm to the persons employing the oxygen. A material, to be capable of sealing connections in such lines, must have definite adhesion so that it is not destroyed or torn away even with repeated separation and assembly of the parts. It must have lubricating or anti-seizing properties, so that the separations and assemblies can be easily performed without destroying threads of fittings. It must be non-corrosive, have a minimum oxygen absorption, must not react with oxygen to form foreign gases, must not ignite from contact with high velocity oxygen, must be odorless, and must be non-toxic with respect to any products generated, when in the presence of oxygen under high pressures, at relatively elevated temperature, and under conditions of high velocity.

It has been found that material capable of sealing fluid lines and of responding to requirements including that of resistance to pressures of 450 pounds per square inch or above, can be prepared in the form of a composition including an alkyl cellulose or cellulose ether, a metallic soap and a powdery lubricating agent. Such a composition is prepared in the form of solution or dispersion in a volatile organic solvent which, upon evaporation, deposits a film of proper characteristics to satisfy the requirements set forth.

A preferred formula comprises:

| | Grams |
|---|---|
| Ethyl cellulose lacquer | 825.5 |
| Zinc stearate | 400 |
| Carbon black | 68 |
| Solvent thinner, to make 1 gallon. | |

With this preferred composition, the quantity of zinc stearate may be varied between 375 and 425 grams, and the carbon black can be varied between 60 and 75 grams. Proportions within these limitations may be selected on the basis of desired behavior of the parts of the separable connections, and in consideration of the mechanical smoothness of the surfaces provided.

A presently preferred form of ethyl cellulose lacquer is a commercial product having the following composition:

| | | |
|---|---|---|
| Wt. 1 gal | pounds | 7.28 |
| Solids | per cent | 20.6 |
| Balance thinner | do | 79.4 |
| Total number of solids | | 150 |
| Ethyl cellulose solids | | 130 |
| Tricresyl phosphate solids | | 20 |
| Ethyl cellulose | per cent | 16.48 |
| Solids of total solids | do | |
| Tricresyl phosphate | per cent | 4.12 |
| Solids of total solids | do | |
| Dry dust free | minutes | 5–10 |
| Dry to handle | do | 20 |

It will be noted that when, under the formula above, 825.5 grams of the selected lacquer is used, 16.48% thereof is ethyl cellulose or 136 grams, and 4.12% is tricresyl phosphate or 34 grams, with a total "solids" content of ethyl cellulose and tricresyl phosphate of 170 grams. Hence, the preferred formulation with 400 grams of zinc stearate represents a quantity of this metallic soap which is substantially three times the quantity by weight of ethyl cellulose; and that the 68 grams of carbon black is in weight one-half of the 136 grams of ethyl cellulose.

The ethyl cellulose is presently preferred as a base, but other cellulose ethers such as butyl, benzyl, etc., may be employed, although having less stability or providing a greater resistance to the movement of parts during separation and assembly, for employment when conditions of high pressures, high temperatures, and absence of toxic products are not demanded.

The tricresyl phosphate forms a desirable non-volatile and non-toxic plasticizer for the cellulose ether, and is essentially inert under all normal conditions of operation of such airplane oxygen lines. Other inert plasticizers of high evaporation point and low vapor pressure may be substituted.

While zinc stearate is preferred, it is feasible to employ other water-insoluble metallic soaps, particularly other metallic stearates such as those of aluminum, calcium and lead. It is preferred, in compositions for use with aircraft oxygen lines and other purposes where respiratory gases may contact with the material, to avoid the employment of oleates or other unsaturated substances. Palmitates are usually found lacking in the necessary physical properties when used alone, but may be employed in partial substitutes for stearates. In preparing the material for service with oxygen lines, it is recommended to use the commercially pure zinc stearate of a melting point between 115 and 130 degrees C.

The carbon black may be replaced by graphite with some advantage regarding stability, but with a disadvantage with regard to preventing seizure: The two are referred to herein as "carbon powder." Other inert powders may also be substituted including powdered mica and talc, finely powdered clays and silica, earth carbonates, etc., but it is preferred to employ the carbon powder where optimum resistance to oxygen, and optimum sealing and anti-seize properties are demanded. Mixtures of such materials may be employed. It is presently preferred to employ carbon black as this operates to improve the anti-seize characteristics of the material and thereby reduces the friction between the metallic parts, in assisting the zinc stearate as an anti-seize compound, and thereby minimizes any tendency for the coating film to rub off during assembly of parts: and the carbon substances have the advantage of providing a definite marking to indicate that a proper coating has been applied to the connector structure.

The lacquer thinner is a volatile liquid which extends the solids to a consistency appropriate to application by brush, dipping, spraying, etc., onto the parts to be treated: and disappears during the deposit of the solids. Various organic substances known in the art may be employed, preferably in the form of mixtures. Thus, an alcohol, an ester or ketone, and a diluent may be used: with selection of the alcohol from the group of methyl, ethyl, butyl, isopropyl, and mixed amyl alcohols, i. e., those having a high vapor tension at ordinary temperature; with selection of the ester or ketone from the acetates of the foregoing alcohols, acetone, methyl-ethyl ketones, or in general esters or ketones likewise having high vapor tensions at room temperature; and with use of toluene, xylene, petroleum fractions, and synthetic aromatic fractions of corresponding vapor tensions.

A preferred method of compounding is to prepare the original lacquer and then stir it while introducing the stearate and powdery lubricant at room temperature, until a smooth lump-free produce is obtained. Then the thinner is added to bring the composition to the desired consistency. The composition is stable, and does not form any hard deposits. It normally does not precipitate or settle.

In applying the coating to threads of aluminum alloy parts, the composition is painted by a brush to form a thin coating on the threads. The parts are dried in air for 15 to 20 minutes, and then are ready for assembly. It is, however, preferred to complete the preparation when facilities are available by baking the coated parts for about three to five minutes at 250 degrees F. and then cooling. The stability and mechanical properties of the composition permit shipping and storing the coated articles without other protection.

The physical properties of the composition according to the preferred formula are as follows:

1. Color _____ Black
2. Ash content _____ 1.8%
3. Baumé value at 70° F. _ 37° light liquid scale
4. Density of dried material _____ 0.646 grams/cc.
5. Metallic components ___ 0.00
6. Corrosion test _____ Non-corrosive In employing equivalents for oxygen line service, the following range of permissable physical properties should be observed:

1. Color _____ As a means of identification after application
2. Ash content _____ Max. 2.5%
3. Baumé value at room temp. _____ 36°–39° light liquid scale
4. Density of dried material after application _____ .75
5. Corrosion test ____ No corrosion Actual tests with the preferred composition have included the following:

For an anti-seize test, aluminum alloy fittings with ¾ inch pipe threads were tightened with a wrench at 850 inch pounds torque: and were subjected to such tightening and loosening several times at minus 70 degrees F., plus 70 degrees F., and plus 165 degrees F. without seizure.

For a leakage test, a treated thread connection was assembled on a fitting and was subjected to an internal oxygen pressure of 450 pounds per square inch and at 250 degrees C. Under these conditions, the coupling was loosened to cause a fast leak but no reaction or ignition was observed.

As a further leakage test, with oxygen pressure at 500 pounds per square inch and with the parts tightened at 96 inch pounds torque (insufficient to produce a seal in the absence of the composition), it was found that there was no leakage at minus 70 degrees F., plus 70 degrees F. and plus 200 degrees F.

In Parr-type oxygen bomb tests, the oxygen contact was maintained for 24 hours at 450 pounds per square inch at 220 degrees F., resulting in 0.82 percent weight loss with carbon black: whereas when graphite was substituted in like quantity, there was a 0.08 percent weight loss. In neither case was carbon dioxide or carbon monoxide formed. The same test was performed with nitrogen and the weight loss with carbon black was 0.5 percent; with graphite, it was 0.1 percent.

Upon heating the article and its coating to 220 degrees F. and maintaining for 20 hours, the air drying loss was 0.38 percent with graphite, and 0.69 percent with carbon black.

In tests with American Gas Association apparatus, there were no traces of carbon monoxide or carbon dioxide being formed when either carbon black or graphite was employed under test at pressures above 500 pounds per square inch at 250 degrees C. Under such tests, it was found that the anti-seize and sealing composition was very stable, with either graphite or carbon black. When the carbon black is used, the composition has the advantage of slightly greater adherence and pliability, and slightly better anti-seize properties, than when graphite is used.

The composition is useful under the highly critical conditions of sealing conduits for employment with oxygen, nitrogen and chlorine under pressure of 500 pounds per square inch or even above, at high temperatures, and at high velocity; and can be employed for sealing against leakage of other fluids. For non-respiratory employments, the purer forms of materials prescribed for preferred practices are not needed, and the specific materials and preferred limitations of proportions can be departed from.

I claim:
1. An anti-seize and sealing composition for a separable connection part of a high pressure oxygen respiratory line consisting essentially of 136 parts by weight of a cellulose ether selected from the group consisting of ethyl, butyl and benzyl cellulose ethers, substantially 34 parts of tricresyl phosphate as a plasticizer of said cellulose ether, 375 to 425 parts of a water-insoluble soap selected from the group consisting of zinc, aluminum, calcium and lead stearates individually and in mixtures with one another, and 60 to 75 parts of powdery particles of inert material, in a volatile organic solvent for the cellulose ether and soap; and characterized by giving a deposited film which under an oxygen gas pressure of 450 pounds per square inch and at high oxygen gas velocity is essentially stable, non-corrosive, odorless, non-inflammable, non-toxic and non-reactive with oxygen.

2. An anti-seize and sealing composition for a separable connection part of a high pressure oxygen respiratory line consisting essentially of a solution in a volatile organic solvent of 136 parts by weight of ethyl cellulose, substantially 34 parts of tricresyl phosphate as a plasticizer of said cellulose ether which is substantially non-volatile at a temperature of 250 degrees C., and 375 to 425 parts of zinc stearate, and containing 60 to 75 parts of suspended powdery particles of carbon, and characterized by giving a deposited film which under an oxygen gas pressure of 450 pounds per square inch and at high oxygen gas velocity is essentially stable, non-corrosive, odorless, non-inflammable, non-toxic and non-reactive with oxygen.

3. An anti-seize and sealing composition consisting essentially of a solution in a volatile organic solvent of 136 parts by weight of ethyl cellulose, substantially 34 parts of tricresyl phosphate, and 375 to 425 parts of zinc stearate, and containing substantially 68 parts of carbon black.

ROBERT C. FUHRMAN.

REFERENCES CITED

The following references are of record in the file of this patent:

UNITED STATES PATENTS

| Number | Name | Date |
|---|---|---|
| 2,367,376 | Rector | Jan. 16, 1945 |
| 2,367,375 | Rector | Jan. 16, 1945 |
| 2,335,958 | Parker | Dec. 7, 1943 |
| 2,157,155 | Work et al. | May 9, 1939 |
| 2,104,408 | Wiezevich | Jan. 4, 1938 |
| 2,098,256 | Parker | Nov. 9, 1937 |
| 191,490 | Sweeney | May 29, 1877 |